March 17, 1942.　　　M. FAEBER　　　2,276,381
HOT WATER BOILER
Filed Dec. 29, 1938　　　4 Sheets-Sheet 1

March 17, 1942. M. FAEBER 2,276,381
HOT WATER BOILER
Filed Dec. 29, 1938 4 Sheets-Sheet 3

INVENTOR.
Murray Faeber
BY Arthur Phelps Marr
ATTORNEY.

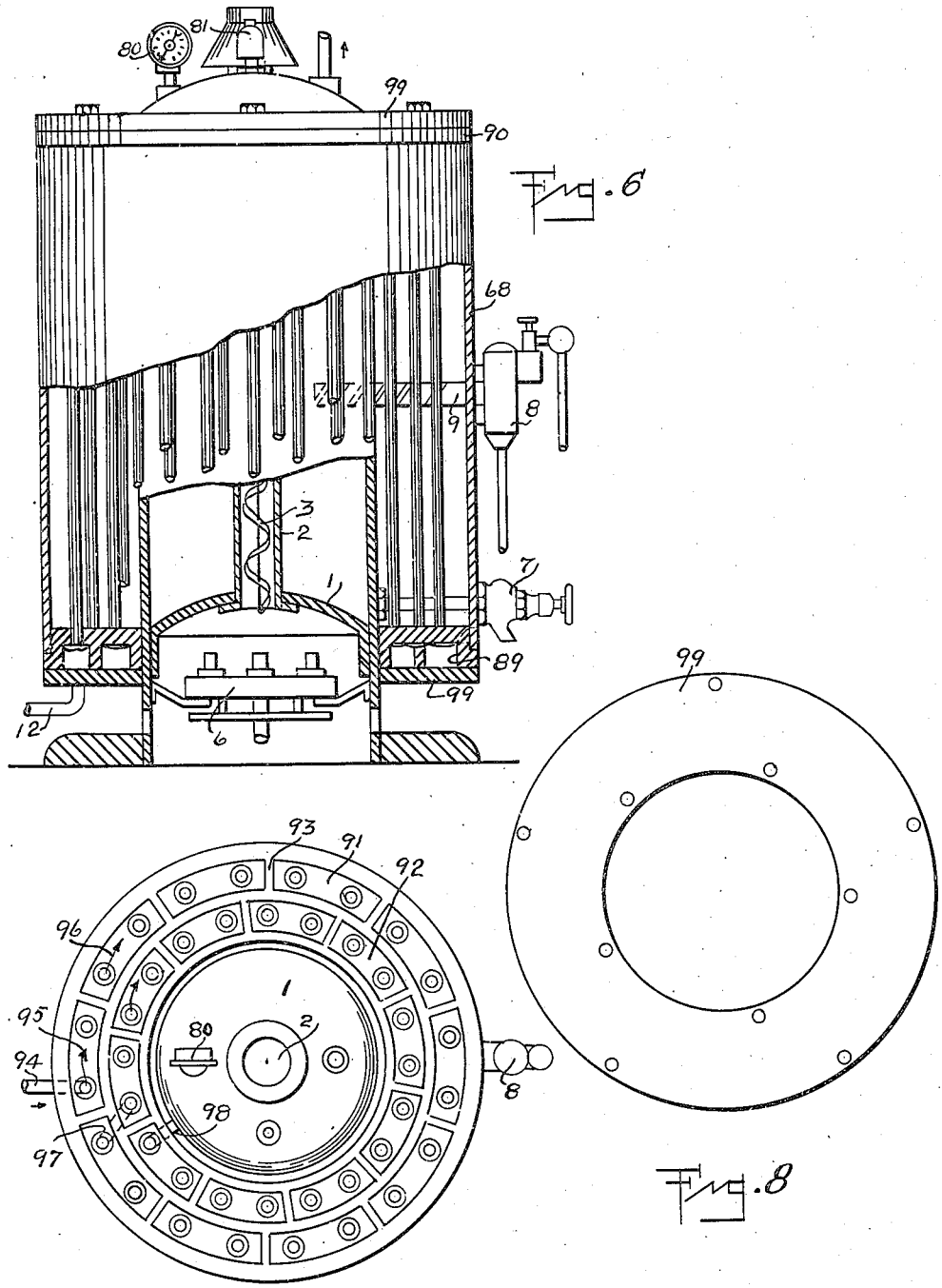

Patented Mar. 17, 1942

2,276,381

UNITED STATES PATENT OFFICE 2,276,381

HOT WATER BOILER

Murray Faeber, Brooklyn, N. Y.

Application December 29, 1938, Serial No. 248,145

5 Claims. (Cl. 122—17)

The device, the subject of this invention and which I refer to as hot water boilers is intended for the purpose of providing hot water to dwellings, apartments or buildings or elsewhere, wherever hot water is required and is not designed for the heating of buildings through the medium of hot water although certain features and more particularly the primary features of the invention may be incorporated into any device where it is desired to heat a continuing flow of liquid of any nature for any purpose.

A principal object of the invention is to provide a water heater wherein only a relatively small amount of water is subject to the direct heat and the incoming or supplying water is preheated by the radiation or convection heat currents emanating from the heated section. The device is therefore made up of a plurality of sections isolated from each other to an extent that shall be found satisfactory and in the construction shown in the drawings, the inner chamber is the only chamber subjected to the direct heat and the outer chambers or members act as absorbers for the stray heat as above suggested.

Another object of the invention of course is that of economy. In the ordinary hot water boiler the entire boiler and all of the water contained therein is subjected to heat and heavy insulation is provided to retain the heat in the heated chamber. In my construction the insulation if such is used is moved outwardly and a preheating chamber or preheating coils are provided which surround the heated chamber and not only act as an insulation for the heated chamber but more particularly they usefully absorb all of the heat discharged through the walls of the heated chamber or radiated therefrom. My device therefor becomes an efficient heat exchanger and by so doing the water entering the heated chamber is preheated which allows for a considerable reduction in the size of the heated chamber and materially reduces the amount of heat that must be applied to that chamber to produce water of the temperature required.

The device which I have shown and described and for the reason thus far set forth, becomes and is actually a heat exchanger, a water preheater, a heat absorber and a heat economizer, and while I have shown a great number of ways of constructing my device, it will be noted that they all operate on the same principle.

Another object of this invention is to show a simple means for enclosing the hot water chamber within the cold water chamber yet isolating the hot and cold water chambers one from the other so that the thermal conductivity between these members will not result from direct contact.

Another object of this invention is to show and described means whereby the cold water chamber will act as an insulation for the hot water chamber, usefully absorbing all of the heat that is radiated from the hot water chamber and which would otherwise be lost and yet not robbing the hot water chamber of any of the heat that is required to heat the water contained therein.

Another object of this invention is to show how my general idea may be carried out in hot water boilers of different constructions and without difficulty.

Other important developments and the means for carrying them out will be found disclosed as the specification progresses.

The following is what I consider the best means of carrying out my invention and the accompanying drawings should be referred to for a complete understanding of the specification.

In the drawings:

Figure 6 is a view similar to that shown in Figure 3 but in this construction I have employed a plurality of tubes, two series being shown.

Figure 7 is a plan view of a header used in the construction shown in Figure 6.

Figure 8 is a plan view of a closure cap such as is used in Figures 3 or 6.

Similar reference numerals indicate like parts in all of the figures where they appear.

In constructing my device I have come to the realization that many designs are possible each having certain advantages but all operating on the same basic principle and in the description which follows I will describe the figures as they appear, but in so doing I do not desire it understood that I am intentionally providing any line of demarcation between the separate devices.

Figure 1:
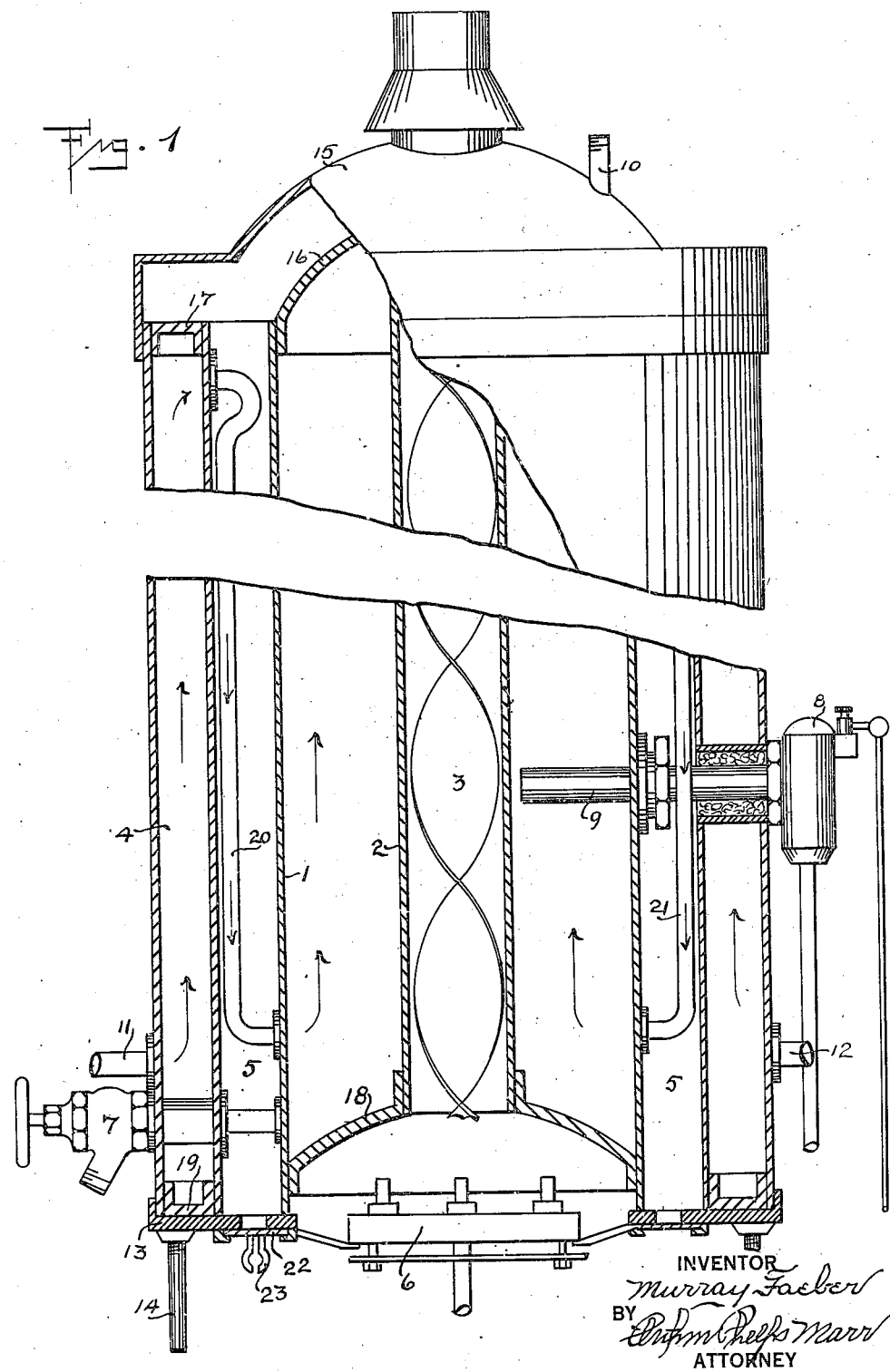
Figure 1 is a vertical fractured and sectional view of a hot water boiler.

In Figure 1, I show a hot water cylinder at 1 and arranged therein is a flue 2 having a baffle 3 extending through the flue to insure contact of the hot gases with the walls of the flue.

The hot water unit 1 as here shown is of conventional design but in this device as in all of the devices which I am about to describe, the hot water unit is made considerably smaller than is the hot water boiler of equal capacity and for the reason that a part of the water under treatment is contained in a cold water or tempered water section which is shown at 4 surrounding the hot water unit 1 and the capacity of the hot water unit 1 and the cold water section 4 is combined to obtain the desired capacity of the heater.

The tempered water unit 4 which is formed independently of the hot water unit 1, is arranged in spaced relation to the hot water unit, the space being indicated at 5 and this space is determined by the temperature at which the hot water unit will operate and is determined also by the radiation and convection from the hot water unit 1 and the capacity of the heating means.

The heating means for this device is shown at 6 and in this instance is a gas heater of a conventional design that need not be described in detail and before proceeding further with the description of the new parts of my device and the operation thereof, I will briefly refer to the parts that are standard in devices of this type.

At 7 I show a draw off means for the hot water chamber and at 8 a thermostat the tube 9 of which enters the hot water unit and this thermostat controls the gas flow and therefore determines the heat of the water in the hot water unit. At 10 I show a hot water outlet and 11 and 12 indicate cold water inlets.

A support for the hot and cold water units is shown at 13 and is provided with legs 14 which may be of any desired length.

Over the hot and cold water units I provide a dome 15 which may be a shell of relatively thin metal for the reason that a closure dome 16 of suitable heavy metal is provided for the hot water unit and a U shaped ring 17 closes the upper end of the tempered water unit. At the lower end of the hot water unit a heavy plate 18 is provided which is dished in the customary manner and a second ring 19 closes the lower end of the tempered water unit.

Within the space 5 which separates the hot water unit from the tempered water unit I provide a plurality of circulating pipes as shown at 20 and 21. These pipes connect a point high up in the tempered water unit with a point low down in the hot water unit, thus assuring that the circulation through my device will follow the arrows upward in the tempered water cylinder downward in the circulating pipes 20 and 21 and into and upward in the hot water unit 1 and the particular objects gained by this construction and circulation is an assurance that only tempered water, water that has already been subject to the heat of radiation and convection from the hot water unit will enter the hot water unit and that the entrance will be low down in this hot water unit so that the heated water will pass upward in the hot water unit and will be delivered at maximum temperature.

In Figure 1 I have shown some parts of an air control which may be used in conjunction with my invention. The reference character 22 indicates a valve to which is secured a valve lever 23, the object of this particular arrangement of an air control is to lengthen the cool down period after the heat has been turned off. With this valve closed circulation through the space 5 between the hot and tempered water units will be so restricted that the space 5 will operate as a more or less complete dead air space which will assist in preventing rapid radiation of the heat from the hot water unit.

In experimenting with the device shown and described, I have discovered that certain if not all of the advantages of my invention can be obtained from constructions of different types.

Figure 2:
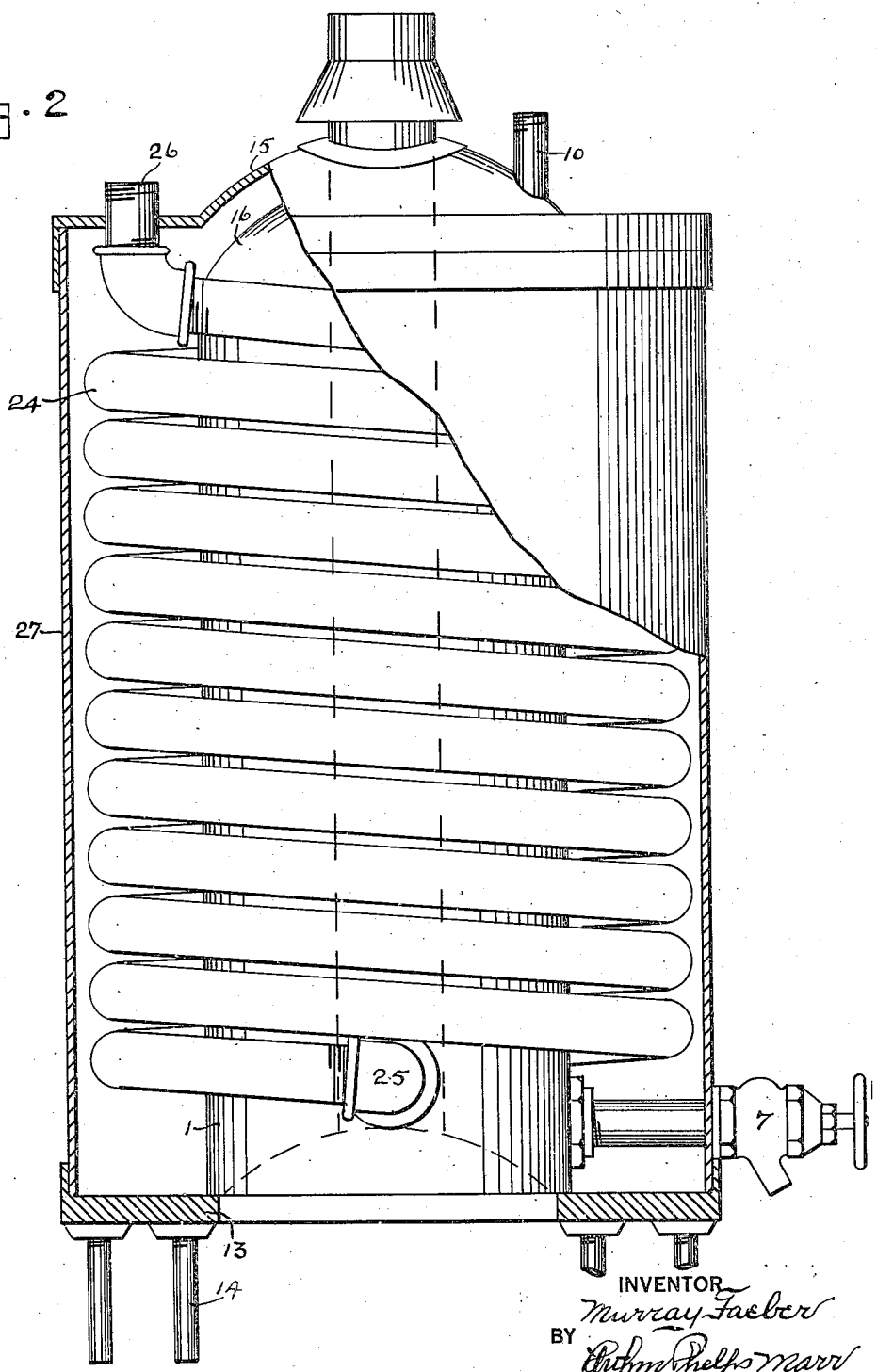
Figure 2 is a fractured view of a hot water boiler having a coiled pipe cold water unit.

It may be found somewhat difficult or relatively expensive to construct a hot water heater with two chambers one surrounding the other and to overcome these difficulties I have constructed the device shown in Figure 2. In Figure 2 the hot water chamber shown at 1 is provided with a draw off valve 7 and the discharge pipe 10. This device is also supported by a means 13 similar but of somewhat heavier construction than the device shown in Figure 1. In this device the cold water chamber is omitted and I substitute a coil of pipe as shown at 24 completely surrounding the hot water chamber 1 and connected to this chamber at a point low down in the chamber as shown at 25. The inlet for the cold water is shown at 26 and surrounding this whole device is a shell 27 which may be a metallic shell or may be insulation.

The construction of the hot water chamber 1 is conventional and as the heating means is also conventional such a heating means is not shown in this figure.

One of the great advantages of this device resides in the fact that because of the head of the incoming water, the hot water cannot back up into the cold water line and because of the small required diameter and height of the hot water chamber this device is quick in recovery and rapid in delivery as the amount of water to which the heat is directly applied is far less than the amount similarly treated in the ordinary hot water heater.

I may provide a pipe damper or a draw off, as shown at 7 in Figure 2, and in every instance all the usual devices, connections and controls found in given standard practice will be included in all of my constructions whether or not they are shown or described.

Thus far I have described a plurality of devices having the same objectives, the principal object of which is to introduce only tempered water to the hot water section of a hot water boiler so as to reduce the amount of heat required to bring the water to the desired temperature. I have also shown and described devices wherein a tempering chamber is provided independently of the heating chamber and in such relation that the tempering chamber will act as a heat absorber for the heat of radiation and convection from the hot water chamber.

Figure 3:
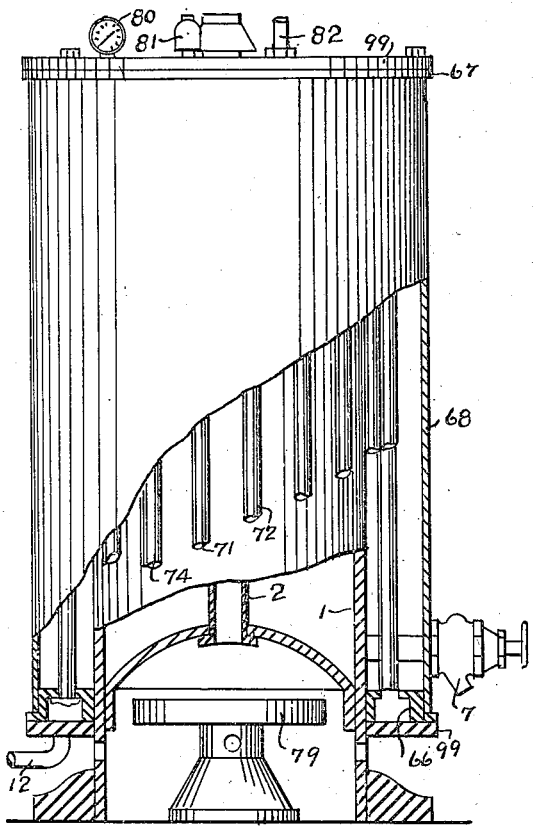
Figure 3 is a fractured partly sectional view of a heater having vertical tubes arranged in a single series around the heated chamber.
Figure 4:
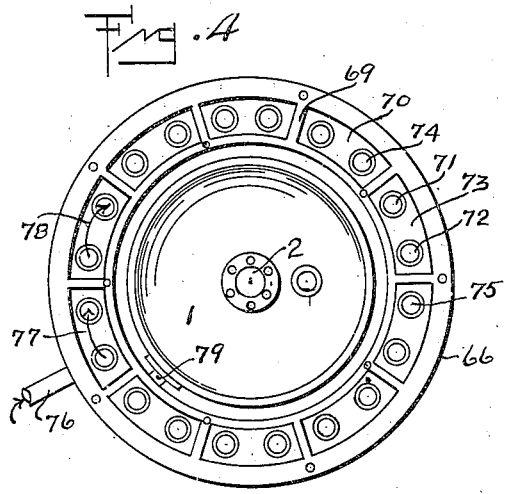
Figure 4 is a plan view of one of the headers in which the tubes are secured.
Figure 5:
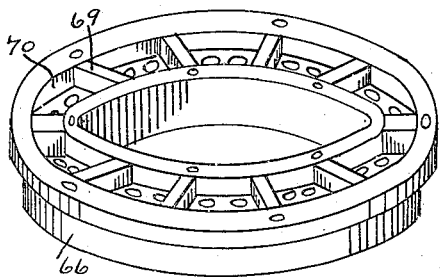
Figure 5 is a perspective view of the header indicating the arrangement of the separating baffles.

Because of the peculiar operation and construction of my device, the greatest efficiency will be obtained if the incoming or preheated water can be retained for a long period of time in heat exchanging relation with the heated member and in experimenting with the devices that I have previously described I have discovered that still other constructions may be employed wherein the time may be extended to a very great degree and these constructions are shown in Figures 3 to 8 inclusive. In Figure 3 the hot water container is again shown at 1 with its flue at 2. The inlet 12 and drain-off 7 have been previously described.

In this construction I provide a plurality of headers 66 and 67 one arranged at each end of the enclosing member or cylinder 68. These headers are formed with a plurality of baffles 69 arranged in a recess 70, the baffles dividing the recess in the header up into a plurality of chambers. Into each of these chambers a plurality of tubes are introduced as shown at 71 and 72 and these tubes may be expanded into the header.

The tubes are arranged in pairs so that the cold water will travel upward in one tube of a pair and downward in the next tube of a pair and to accomplish this it will be understood that the baffles in the opposite headers are not directly opposite but in staggered relation so that whereas tubes 71 and 72 are connected by the recess 73 the recesses in the header at the opposite end connect the tube 71 with the tube 74 and the tube 72 with the tube 75.

The water entering at 76 passes upward and downward in the tubes as indicated by the arrows 77 and 78 and is finally allowed to enter the hot water chamber 1 through the connection 79.

The heating means for the device shown in Figure 3 is indicated at 79 and may be electricity, gas, oil or any other suitable fuel and it will be noted that I show in this figure a hot water temperature gauge 80, a safety valve 81 and a hot water outlet 82, all of my devices may be provided with these desirable features or they may be omitted if not required.

I have previously stated that it is desirable to maintain the incoming water in heat absorbing relation for the greatest possible length of time and while in Figure 3 I have shown a single series of vertical tubes, in Figures 6 and 7 I show a construction providing for a double series of vertical tubes and of course it will be understood that by an increase of size and the proper provisions, a plurality or series of tubes may be employed.

In Figure 6 the headers are shown at 89 and 90 each having two sets of recesses cast or provided therein as shown at 91 and 92. Again barriers 93 are provided in the recess to separate them into several chambers and again each chamber receives two tubes.

Water entering at 94 passes upward and downward through all of the tubes of the outer series as indicated by the arrows 95 and 96 and after making a complete circle about the inner heater 1, the water is transferred to the inner series of tubes by the means as shown at 97, and, having again made a complete circle about the heated chamber, the water is allowed to enter the heated chamber through the connection 98.

In this device the size of the interior or heated chamber can be further reduced as the second series of tubes provides additional space for the water allowing a less quantity to be required in the heated chamber and this less quantity to be in direct influence of the heat from the fuel.

In Figure 8 I show a cover plate 99 and it will of course be understood that such cover plates are used to close the chambers in the heaters 66, 67, 89 and 90.

While I have tried to set forth and describe my device in detail I realize that other changes and modifications may be made within the scope of the appended claims without departing from the principle or sacrificing the advantages of the invention.

Having carefully and fully described my invention, what I claim and desire to obtain is:

1. In a water heater an inner water container, a flue passing through said container, means to supply heat to said flue, an outer water container totally enclosing the sides of the inner container and so spaced from the inner container as to provide a free air space between said containers so as to facilitate the heating of the outer container by convection or radiation from the inner container, means for preventing the direct heat from the heating means reaching or impinging upon said outer container and means for admitting water to said outer container and means for passing said water from said outer container to said inner container.

2. In a hot water heater the combination of a source of heat; a hot water tank; at least one flue passing therethrough and positioned to absorb substantially all of the heat from said source of heat; a temperate water unit positioned in spaced relationship to the hot water tank, so as to be heatable thereby through convection or radiation, and in spaced relationship to the source of heat, so as not to absorb any heat directly from said source; the said temperate water unit comprising an upper and a lower header connected by a plurality of vertical water tubes forming a substantially circular cage; each header comprising a plurality of compartments, the tubes being connected in series by means of said compartments; an inlet into said temperate water unit; a water conduit between said temperate water unit and said hot water tank; and an outlet from said hot water tank.

3. In a hot water heater the combination of a source of heat; a hot water tank, at least one flue passing therethrough and positioned to absorb substantially all of the heat from said source of heat; a temperate water unit positioned in spaced relationship to the hot water tank, so as to be heatable thereby through convection or radiation, and in spaced relationship to the source of heat, so as not to absorb any heat directly from said source; the said temperate water unit comprising an upper and a lower header connected by a plurality of vertical water tubes forming a substantially circular cage; each header comprising a plurality of sub-divisions; each subdivision having a plurality of compartments; the tubes being connected in series by means of said compartments; an inlet into said temperate water unit; a water conduit between said temperate water unit and said hot water tank; and an outlet from said hot water tank.

4. In a hot water heater the combination of a source of heat; a hot water tank; at least one flue passing therethrough and positioned to absorb substantially all of the heat from said source of heat; a temperate water unit positioned in spaced relationship to the hot water tank, so as to be heatable thereby through convection or radiation, and in spaced relationship to the source of heat, so as not to absorb any heat directly from said source; the said temperate water unit comprising a coil of substantially helical configuration; an inlet into said temperate water unit; a water conduit between said temperate water unit and said hot water tank and an outlet from said hot water tank.

5. In a water heater an inner water container, a flue passing through said container, means to supply heat to said flue, an outer water container substantially enclosing the sides of the inner container and so spaced from the inner container as to provide a free air space between said containers so as to facilitate the heating of the outer container by convection or radiation from the inner container, means for preventing the direct heat from the heating means reaching or impinging upon said outer container and means for admitting water to said outer container and means for passing said water from said outer container to said inner container.

MURRAY FAEBER.